United States Patent [19]
Gambill et al.

[11] Patent Number: 5,130,640
[45] Date of Patent: Jul. 14, 1992

[54] SOLDERING IRON TESTING APPARATUS

[75] Inventors: Terry A. Gambill, N. Perry; Roger B. Fell, Madison; Roger A. Stancliff, Ashtabula, all of Ohio

[73] Assignee: Tegam, Inc., Madison, Ohio

[21] Appl. No.: 546,038

[22] Filed: Jun. 28, 1990

[51] Int. Cl.$^5$ .................. G01R 15/12; G01R 31/02
[52] U.S. Cl. ................. 324/73.1; 324/510; 324/511; 374/142
[58] Field of Search ............ 324/73.1, 510, 511, 324/142; 219/241, 449, 450, 497; 374/2, 4, 5, 7, 179–182; 228/56.5

[56] References Cited
U.S. PATENT DOCUMENTS

| | | | |
|---|---|---|---|
| 2,583,424 | 1/1952 | Haslett | 324/511 |
| 3,728,617 | 4/1973 | Potter | 324/510 |
| 3,868,566 | 2/1975 | Parsons et al. | 324/510 |
| 3,943,326 | 3/1976 | Henry | 219/241 |
| 4,590,363 | 5/1986 | Bernard | 219/497 |
| 4,847,471 | 7/1989 | Wallgren et al. | 219/497 |
| 4,878,016 | 10/1989 | Wahl | 324/73 R |
| 4,891,497 | 1/1990 | Yoshimura | 219/241 |
| 4,936,690 | 6/1990 | Goltzinger | 374/181 |
| 4,960,975 | 10/1990 | Weinbrecht | 219/241 |

Primary Examiner—Kenneth A. Wieder
Assistant Examiner—William J. Burns
Attorney, Agent, or Firm—Oldham, Oldham & Wilson

[57] ABSTRACT

A method and apparatus for testing handheld soldering irons having a three wire soldering tip by touching the soldering iron tip to a single point sensor to measure tip temperature, tip voltage to ground the tip resistance to ground. A thermocouple sensor for use with a soldering iron testing apparatus is described.

16 Claims, 3 Drawing Sheets

SOLDERING IRON TESTING APPARATUS

FIELD OF INVENTION

This invention relates generally to apparatus for testing three wire hand-held soldering irons to determine whether various soldering iron operating parameters, tip temperature, tip voltage to ground, and tip resistance to ground, are within acceptable limits.

BACKGROUND OF THE INVENTION

To assure high quality solder joints and avoid damage to sensitive electronic components during production procedures, it is important that various soldering iron operating parameters be maintained within acceptable limits. This fact has been widely recognized and has motivated the adoption of several standards and specifications:
DOD-STD-2000-1B
DOD-HDBK-263
WS 6536E-2
MIL-S-45743E
MIL-STD-2000 1989.

The standards and specifications require measurement of soldering iron tip temperature, tip voltage to ground and tip resistance to ground.

One prior art device, Wahl, U.S. Pat. No. 4,878,016, discloses an apparatus for measuring all three parameters. Wahl uses a single sensor, a thermocouple, for making all three measurements. Because the sensor is a thermocouple, the temperature of the soldering iron tip causes a temperature induced voltage when measuring tip voltage to ground and tip resistance to ground. This temperature induced voltage is typically 20 mV to 50 mV depending on the thermocouple type. The tip voltage to ground limit in several of the standard is 2 mV. It is not possible to measure tip voltage and ground without compensating for temperature induced voltage. The temperature induced voltage introduces errors of 10% or more when measuring tip resistance to ground. The Wahl apparatus shorts the thermocouple wire ends to eliminate the effect of the temperature induced voltage.

SUMMARY OF THE INVENTION

The present invention is directed to an improved method and apparatus for testing three wire soldering irons and related heating devices such as desoldering devices, solder pots and solder waves. Electrostatic discharge devices such as wrist straps are also tested. The soldering iron tip is touched to a single sensor to measure tip temperature, tip voltage to ground, and tip resistance to ground. In addition to numeric indication of the measured value, a pass/fail indication is provided.

The sensor is a Type K beaded wire thermocouple. The thermocouple junction is raised above the sensor mount to make the junction readily visible and accessible. The soldering iron tip is placed against the thermocouple junction from below the raised wire and a bead of solder is placed on the thermocouple junction from above.

The remote ends of the two thermocouple wires are selectively connected through an electronic switch to a temperature measuring circuit, a voltage measuring circuit or a resistance measuring circuit. A microcontroller is used to control the electronic switch.

In the temperature measuring mode, the differential voltage developed across the thermocouple wire ends is applied through input-protection resistors to an amplifier circuit. The resulting voltage is then converted to a digital signal. The microcontroller converts the digital signal to a normalized temperature signal.

In the voltage measuring mode, the common-mode voltage appearing at the thermocouple ends is applied through loading resistors to an amplifier circuit. The resulting voltage is then converted to a digital signal. The microcontroller converts the digital signal to a normalized voltage signal. The loading resistors are selected to eliminate the temperature induced voltage caused by heating the thermocouple junction.

In the resistance measuring mode, a current is placed through a precision resistor, one wire of the thermocouple, the soldering iron tip and then to ground. The voltage drop across the precision resistor is measured to determine the current magnitude. The voltage between the thermocouple junction and ground is measured through the second wire of the thermocouple. By passing the current through one side of the thermocouple and taking the voltage measurement through the other side of the thermocouple, the effect of the sensor resistance is removed from the voltage measurement. The voltage present at the second wire of the thermocouple and the voltage drop across the precision resistor are measured with the current source turned off. These voltages represent the temperature induced voltage and is substracted from the current induced voltage before calculating tip resistance to ground. This eliminates the effect of any temperature induced voltage on the tip resistance measurement. The resulting voltages are converted to digital signals. The microcontroller calculates the tip resistance to ground using Ohm's Law.

The normalized signals from the microcontroller are numerically displayed using an LED display. Additionally, the LED display provides pass/fail indication.

DETAILED DESCRIPTION OF THE INVENTION

Because electronic components are vulnerable to damage by electrostatic discharge, soldering equipment used by defense contractors must conform to Department of Defense standards. The purpose of these standards is to prevent a system failure caused by damage to a sensitive component during the manufacturing process. The present invention, a soldering iron testing apparatus, was developed to test soldering irons for conformance with these standards.

The soldering iron testing apparatus allows a soldering iron to be tested by touching the soldering iron tip to a single point sensor 10. With the soldering iron tip in contact with the sensor 10, the three critical parameters, tip temperature, tip voltage to ground and tip resistance to ground, are sequentially measured by rotating a function select switch 76 for each desired parameter.

An auxiliary sensor 10' is provided for temperature testing of soldering pots and soldering waves. In addition, the soldering iron testing apparatus can also test the resistance of electrostatic discharge devices, such as electrostatic discharge wrist straps.

Figure 1:
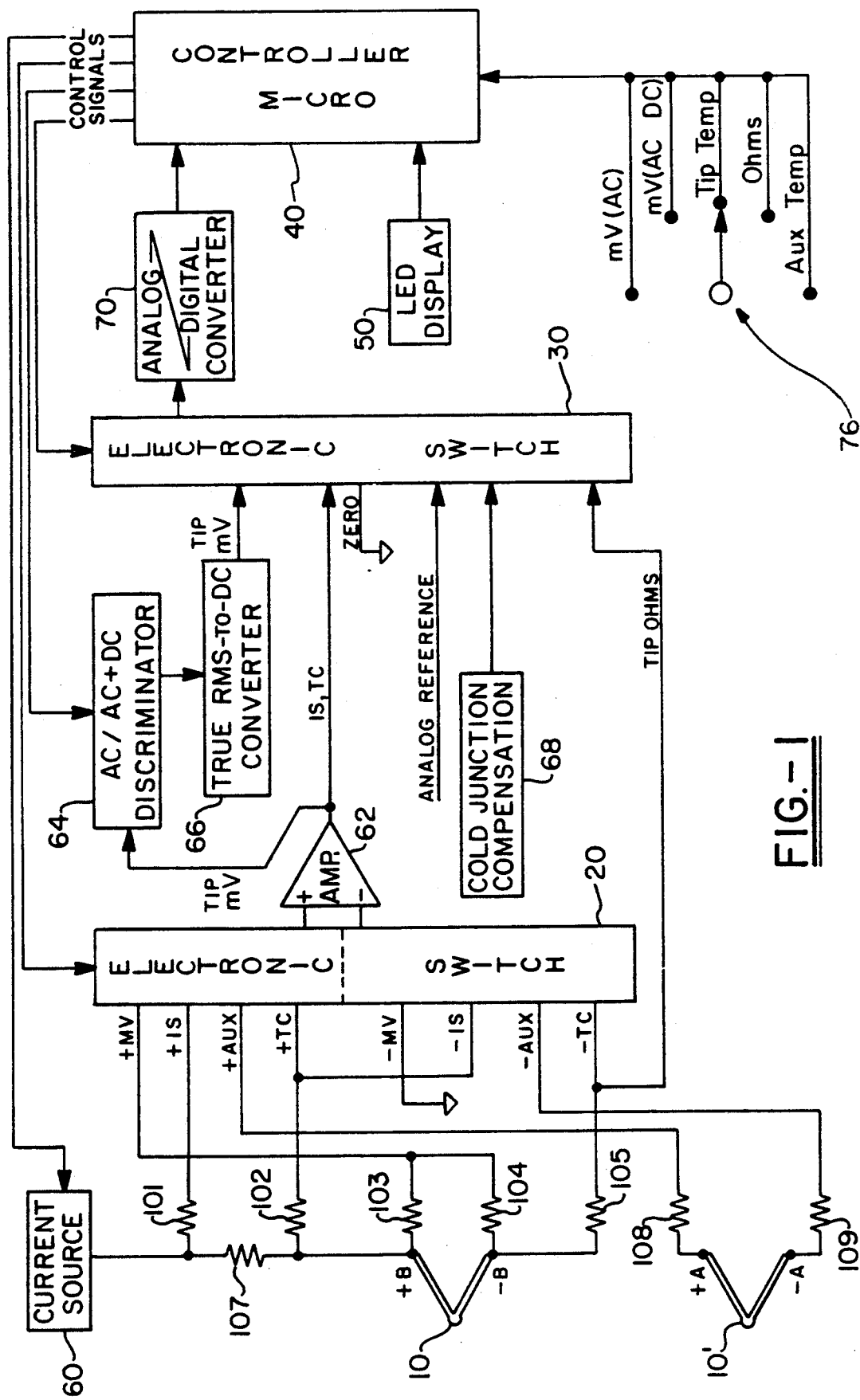
FIG. 1 is a block diagram of the soldering iron testing apparatus signal processing circuit.
Figure 2A:
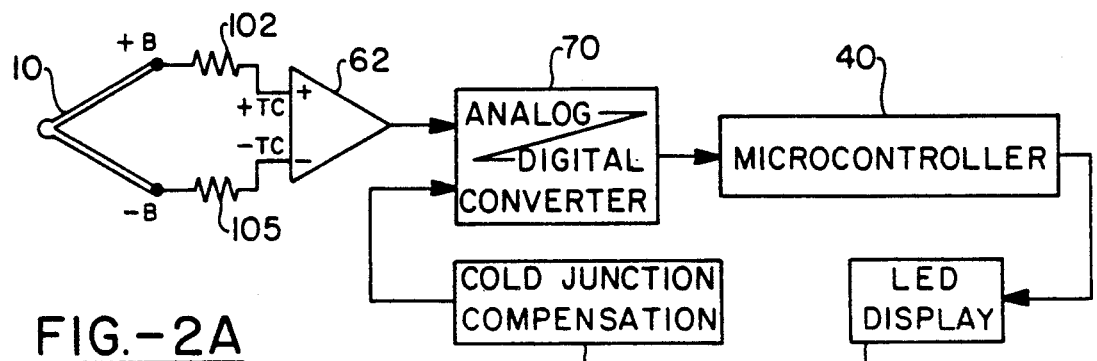
FIG. 2A is a schematic representation of the temperature measuring circuit.
Figure 2B:
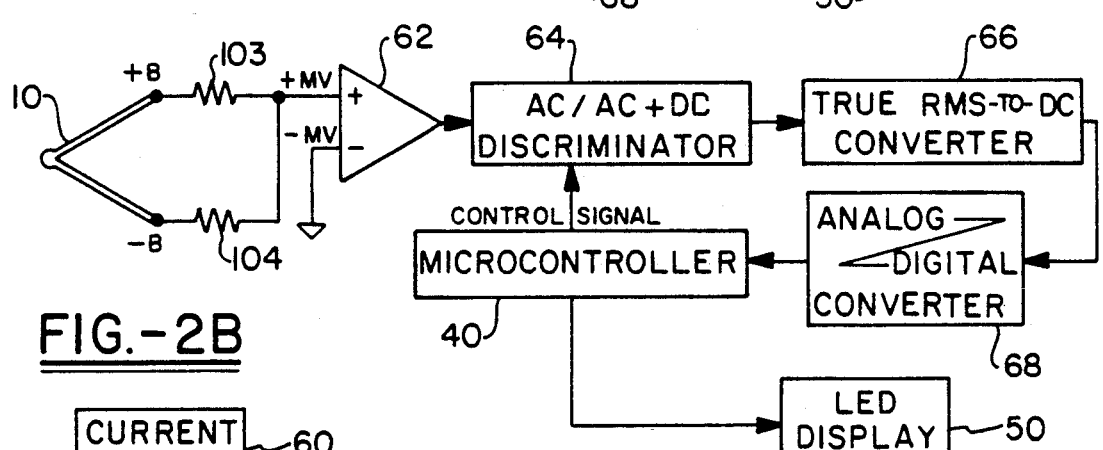
FIG. 2B is of the voltage measuring circuit.
Figure 2C:
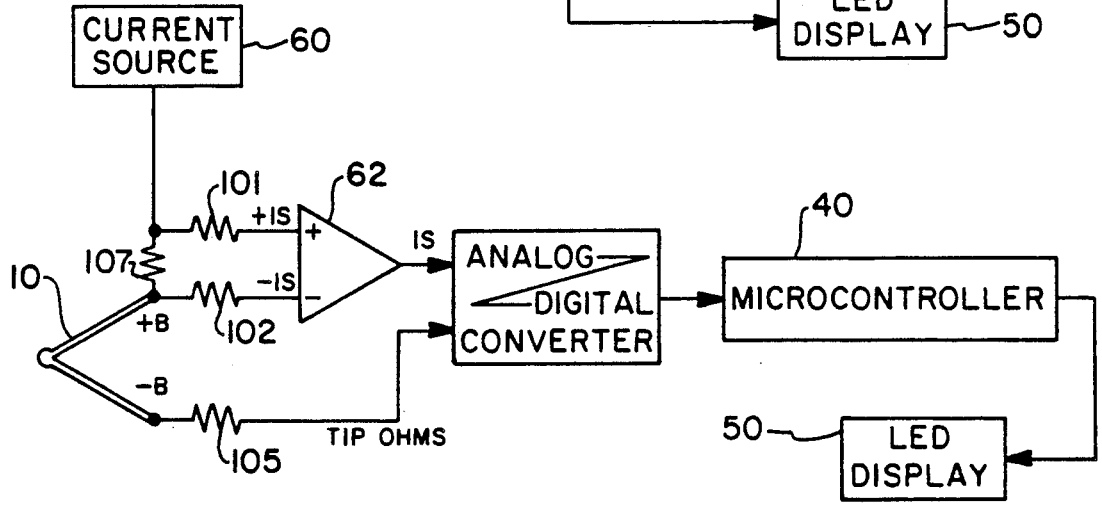
FIG. 2C is of the resistance measuring circuit.

The sensor 10 is a typical Type K thermocouple. The block diagram in FIG. 1 shows resistance values used with Chromel-Alumel thermocouples.

A microcontroller 40 is used to control the testing of a soldering iron. The function select switch 76 is set to the desired parameter. The microcontroller 40 controls two electronic switches 20, 30 to select the appropriate measurements to be connected to an analog to digital convertor 70 where a voltage signal is converted to an equivalent frequency signal. The electronic switches 20, 30 are CMOS multiplexors. The frequency signal is then processed by the microcontroller 40. The microcontroller normalizes the signal and compares the normalized signal to acceptable limits. An LED circuit 50 then displays the appropriate numeric value and indicates whether the measurement passes or fails the appropriate standard. When measuring the soldering iron tip temperature, the microcontroller 40 uses an appropriate thermocouple equation and linearizes the temperature indicating frequency signal.

In addition to the measured parameters, tip temperature, tip voltage to ground and tip resistance to ground, an analog reference signal, a zero reference signal and a cold junction compensation signal 68 can be switched to the analog to digital convertor 70. The zero reference signal and the analog reference signal are used by the microcontroller to adjust system gain and offset. The cold junction compensation circuit 68 responds to ambient temperature at the thermocouple 10 to generate an ambient temperature compensation signal.

During measurement of tip temperature, the function selector switch 76 is set to tip temperature. The microcontroller 40 controls the electronic switch 20 to switch the +TC and −TC inputs to an amplifier 62. Input-protection resistors 102 and 105 are placed in series with the thermocouple 10. These resistors protect the electronic switch 20 from inadvertently applied overvoltage signals. The output of the amplifier 62 is connected through electronic switch 30 to the analog to digital convertor 70.

Input-protection resistors 101, 102, 103, 104, 108 and 109 are placed in series with the voltage (+MV, −MV), current (+IS, −IS), and auxiliary thermocouple 10' (+AUX, −AUX) signals.

During measurement of tip voltage to ground, the function select switch 76 is set to mV(AC) or mV(AC+DC). The microcontroller 40 controls the electronic switch 20 to switch the +MV and −MV inputs to the amplifier 62. Input-protection/loading resistors 103 and 104 are placed in series with the thermocouple 10.

The common-mode voltage potential at the ends of the thermocouple 10 includes any voltage to ground from the soldering iron tip and the temperature induced voltage from the thermocouple 10. Since the temperature induced voltage can be 10 to 100 times the magnitude of the tip voltage to ground, it is necessary to eliminate the temperature induced voltage from the measurement.

Thermal induced voltage error in Type K thermocouple sensors is minimized when the +ve and −ve leg outputs of the thermocouple are weighted by 0.5:1 respectively and summed. The temperature induced voltage of the +ve leg is approximately twice the temperature induced voltage of the −ve leg (these voltages are with respect to the copper tip of the soldering iron). The value of input-protection/loading resistor 103 is twice the value of the input-protection/loading resistor 104. Resistors 103 and 104 are both inputprotection and loading resistors.

For other types of thermocouples, the ratio of the loading resistors should be the same as the ratio of the temperature induced voltages (the +ve and −ve leg outputs). Because the temperature induced voltages vary from thermocouple to thermocouple, the temperature induced error is essentially eliminated if the ratio of the loading resistors is between 0.75 and 1.25 of the ratio of the temperature induced voltages.

The output of the amplifier 62 is connected to an AC/AC+DC discriminator 64. If the function select switch 76 is set to mV(AC), the discriminator 64 removes any DC voltage from the amplifier 62 output. If the function select switch 74 is set to mV(AC+DC), the discriminator 64 passes the amplifier 62 output without change. The amplified voltage then passes to a true RMS to DC convertor 66 which converts the AC or AC+DC voltage to a normalized DC voltage. The output of the true RMS to DC convertor 66 is connected through electronic switch 30 to the analog to digital convertor 70.

During measurement of tip resistance to ground, the function select switch 76 is set to Ohms. The microcontroller 40 controls the electronic switches 20, 30 to make four measurements to calculate tip resistance to ground. The first two measurements are background measurements to remove any error signals present. The first background measurement is the voltage drop across a precision resistor 107. The microcontroller 40 controls the electronic switch 20 to switch the +IS and −IS inputs to the amplifier 62. The second background measurement is the voltage to ground present at the second wire (B−) of the thermocouple 10. The voltage is connected through electronic switch 30 to the analog to digital convertor 70. These background measurements are used to account for temperature induced voltages.

The microcontroller 40 then turns on a current source 60 which passes a current through precision resistor 107 to the first wire (B+) of the thermocouple 10 then through the soldering iron to ground. While the current is turned on, a second measurement of the voltage drop across the precision resistor 107 (+IS, −IS) is taken. The background measurement of the voltage drop across the precision resistor 107 is subtracted from the second measurement of the voltage drop across the precision resistor 107 to obtain the induced voltage drop. Ohm's law is then used to determine the current being applied to the soldering iron tip.

While the current is turned on, the microcontroller 40 measures the voltage to ground present at the second wire (B−) of the thermocouple 10. The background measurement of voltage to ground is subtracted from the second measurement of voltage to ground present at the second wire (B−) of the thermocouple 10 to calculate the induced voltage to ground. Ohm's law is then used with the calculated current and induced voltage to ground to calculate resistance to ground.

Any alternating component of the four measurements (such as tip voltage to ground) is eliminated from these measurements by the analog to digital convertor 70. If the alternating component of the background signal is not removed by the analog to digital convertor 70, a separate discriminator must be provided.

Any errors due to temperature induced voltages are removed from the resistance measurement when the two background measurements are subtracted. Any error caused by the resistance of the thermocouple wires is removed by delivering the current to one leg of the thermocouple and measuring the voltage through the other leg.

Figure 3:
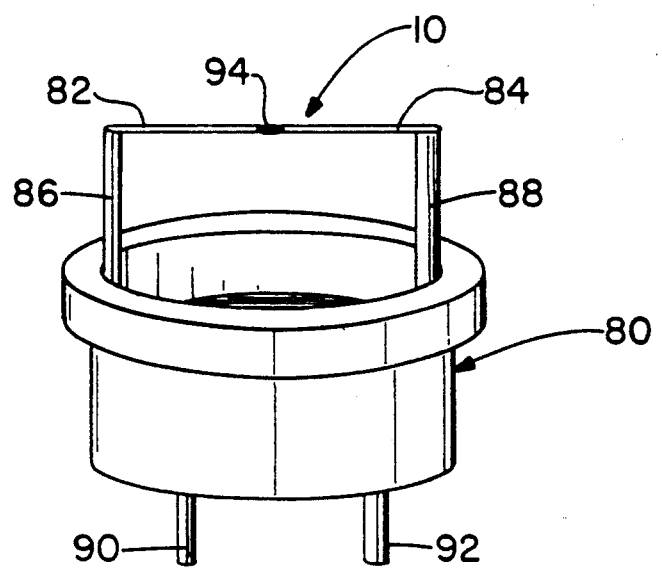
FIG. 3 is a perspective view of a sensor and sensor mount for use with a soldering iron testing apparatus.
Figure 4:
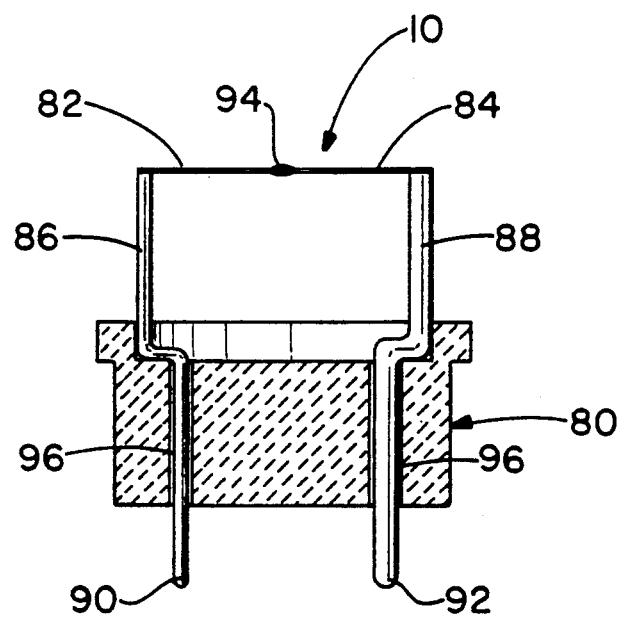
FIG. 4 is a cross-section of the sensor and sensor mount shown in FIG. 3.

The sensor shown in FIGS. 3 and 4 consists of a substantially cylindrical body 80 formed of electrically and thermally insulating material such as ceramic or glass filled Teflon. Two passages 96 extend through the body 80. First and second wires 82 and 84 of dissimilar metal are joined together at a junction 94 to form a thermocouple 10. Two support members 86 and 88 support the thermocouple 10 in a raised position above the body 80. These support members 86 and 88 are attached to the body 80 so that the support members 86 and 88 and the thermocouple 10 are held in a rigid fixed raised position. The lower end of the support members 86 and 88 are attached to elongated members 90 and 92. The elongated members 90 and 92 extend through the passages 96. The elongated members 90 and 92 are shaped differently to assure the sensor can only be inserted in the correct orientation. The members 82, 86 and 90 are formed of the same thermocouple metal, Chromel. The members 84, 88 and 92 are formed of different thermocouple metal, Alumel.

I claim:

1. A temperature sensor for use in combination with a soldering iron testing apparatus comprising: a) a body for supporting said temperature sensor formed of electrically and thermally insulating material, b) a thermocouple associated with said soldering iron testing apparatus formed from first and second dissimilar metal wires being joined at one end thereof to form a thermocouple junction, positioned exterior to said body and means to support the thermocouple junction so that it is possible to place a soldering iron tip against the thermocouple junction from below and a bead of solder placed upon the thermocouple junction from above.

2. An apparatus, useful in combination with a soldering iron having a working tip nominally connected to electrical ground, for measuring the tip temperature, tip voltage to ground and tip resistance to ground, said apparatus comprising:
   sensor means including first and second dissimilar metal wires each having first and second ends with said first ends being joined at a junction to form a thermocouple;
   means for mounting said sensor means with said junction readily accessible for contact by said working tip;
   temperature measuring means responsive to an applied input voltage for producing an output digital signal related thereto;
   voltage measuring means responsive to an applied input voltage for producing an output digital signal related thereto;
   resistance measuring means including a current source means for supplying a current to 1) a current measuring means and 2) said first metal wire second end; and means for producing an output digital signal related to 1) the voltage between ground and said second metal wire second end and 2) the voltage drop produced across said current measuring means; and
   switching means operable in a temperature mode for applying the voltage between said first and second wire second ends to said temperature measuring means; operable in a voltage mode for applying the common-mode voltage appearing on said first and second wire second ends to said voltage measuring means; and operable in a resistance mode for alternately applying 1) the voltage appearing between said second metal wire second end and ground and 2) the voltage drop produced across said current measuring means to said resistance measuring means.

3. The apparatus as in claim 2 having additional resistances in series with said first and second metal wires, the ratio of the additional resistance in series with said first metal wire to the additional resistance in series with said second metal wire being between 0.75 and 1.25 of the ratio of the temperature induced voltage of the first metal wire to the temperature induced voltage of the second metal wire.

4. The apparatus as in claim 2 wherein said first metal wire consists of chromel and said second metal wire consists of alumel; and having additional resistance in series with said metal wires when said switching means is in said voltage mode, the additional resistance in series with said chromel wire being twice the additional resistance in series with said alumel wire.

5. The apparatus as in claim 2 having discriminating means for eliminating any direct current present when said switching means is in the voltage mode.

6. The apparatus as in claim 2 whereby said switching means consists of an electronic switch.

7. The apparatus as in claim 2 including a microcontroller whereby said microcontroller produces an output signal proportional to the output digital signals produced by said temperature measuring means, said voltage measuring means and said resistance measuring means and including a display means responsive to said output signal for producing a visual numerical representation thereof; said microcontroller also controlling the operation of said switching means.

8. The apparatus as in claim 7 wherein said display means further includes means for visually indicating whether or not said output digital signals are within a predetermined range.

9. The apparatus as in claim 2 wherein said temperature measuring means, said voltage means and said resistance measuring means use a common voltage to digital signal converter.

10. The apparatus as in claim 2 wherein said voltage measuring means includes a conversion means responsive to an applied voltage having an alternating current component for producing an output direct current voltage related thereto.

11. The apparatus as in claim 2 wherein said sensor means comprises:
   a body formed of electrically and thermally insulating material, said body having two passages;
   a thermocouple formed from two dissimilar metal wires, each having first and second ends with said first ends being joined at a junction;
   a first support member being formed of said first dissimilar metal attached to said second end of said first dissimilar metal wire; a second support member being formed of said second dissimilar metal attached to said second end of said second dissimilar metal wire, whereby said support members raise said thermocouple above said body so as to place said thermocouple junction in a readily visible position;

said support members being attached to said body; and said support members being elongated whereby said support members extend through and beyond said passages.

12. A method for testing a soldering iron having a working tip for determining the tip temperature, the tip voltage to ground and the tip resistance to ground, said method including the steps of:

touching said working tip to a first junction formed by the first ends of first and second electrically conductive members comprising a thermocouple; then alternately a) measuring the differential voltage produced across the second ends of said thermocouple members and converting said differential voltage to a temperature indicating output signal within a normalized range;

b) connecting additional resistance at a second junction in series with the second ends of said thermocouple members, the ratio of the additional resistance in series with said first electrically conductive member to the additional resistance in series with said second electrically conductive member being between 0.75 and 1.25 of the ratio of the temperature induced voltage of the first electrically conductive member to the temperature induced voltage of the second electrically member, measuring the common-mode voltage appearing at said second junction of said additional resistances, and converting said measured voltage to a voltage indicating output signal within a normalized range;

c) supplying a current through a current measuring means to said first electrically conductive member, measuring the voltage drop across said current measuring means, measuring the induced voltage present at the second end of said second electrically conductive member and converting said measurements to a resistance indicating output signal within a normalized range; and responding to said output signals to produce a visual display respectively indicating the magnitude of said tip temperature, tip voltage to ground and tip resistance to ground.

13. The method of claim 12 including the further steps of visually indicating whether or not the magnitude of said tip temperature, voltage to ground and resistance to ground are within a predetermined range.

14. The method of claim 12 including the further steps of measuring any background voltage present at the second end of said electrically conductive member, then subtracting said background voltage from said induced voltage and measuring any background voltage drop across said current measuring means, then subtracting said background voltage drop from said voltage drop across said current measuring means prior to converting said measurements to a resistance indicating output within a normalized range.

15. A temperature sensor for use in combination with a soldering iron testing apparatus comprising:

1) a body formed of electrically and thermally insulating material, said body having top and bottom surfaces and at least two passages;

2) first and second support members, said first support member being formed from a metal material, said second support member being formed of a second metal material which is dissimilar to said first metal, wherein each of said first and second support members are positioned and secured within one of said passages respectively so as to be exposed adjacent said bottom surface of said body and to extend above said top surface;

3) a thermocouple associated with said soldering iron testing apparatus, formed from first and second dissimilar metal wires, said first wire being formed of said first metal material and said second wire being formed of said second metal material, each wire having first and second ends with said first ends being joined at a junction; and said second ends being supported on said first and second support members respectively, wherein said thermocouple is supported on said first and second support members so as to be suspended above said top surface of said body and exposed to air on all sides thereof a first support member being formed of said first dissimilar metal attached to said second end of said first dissimilar metal wire; a second support member being formed of said second dissimilar metal attached to said second end of said second dissimilar metal wire, whereby said support members raise said thermocouple above said body so as to place said thermocouple junction in a readily visible position;

said support members being attached to said body; and said support being elongated whereby said support members extend through and beyond said passages.

16. The sensor of claim 15 wherein the thermocouple is spaced sufficiently from the body to allow the tip of a soldering iron to be tested to be placed between the thermocouple and the body and brought into contact with the thermocouple without contacting the body or the support members.

* * * * *